Dec. 19, 1967  R. M. HOFFMANN ET AL  3,358,510
LIQUID LEVEL GAUGE AND METHOD OF MAKING A GAUGE ENCLOSURE
Filed Nov. 18, 1964
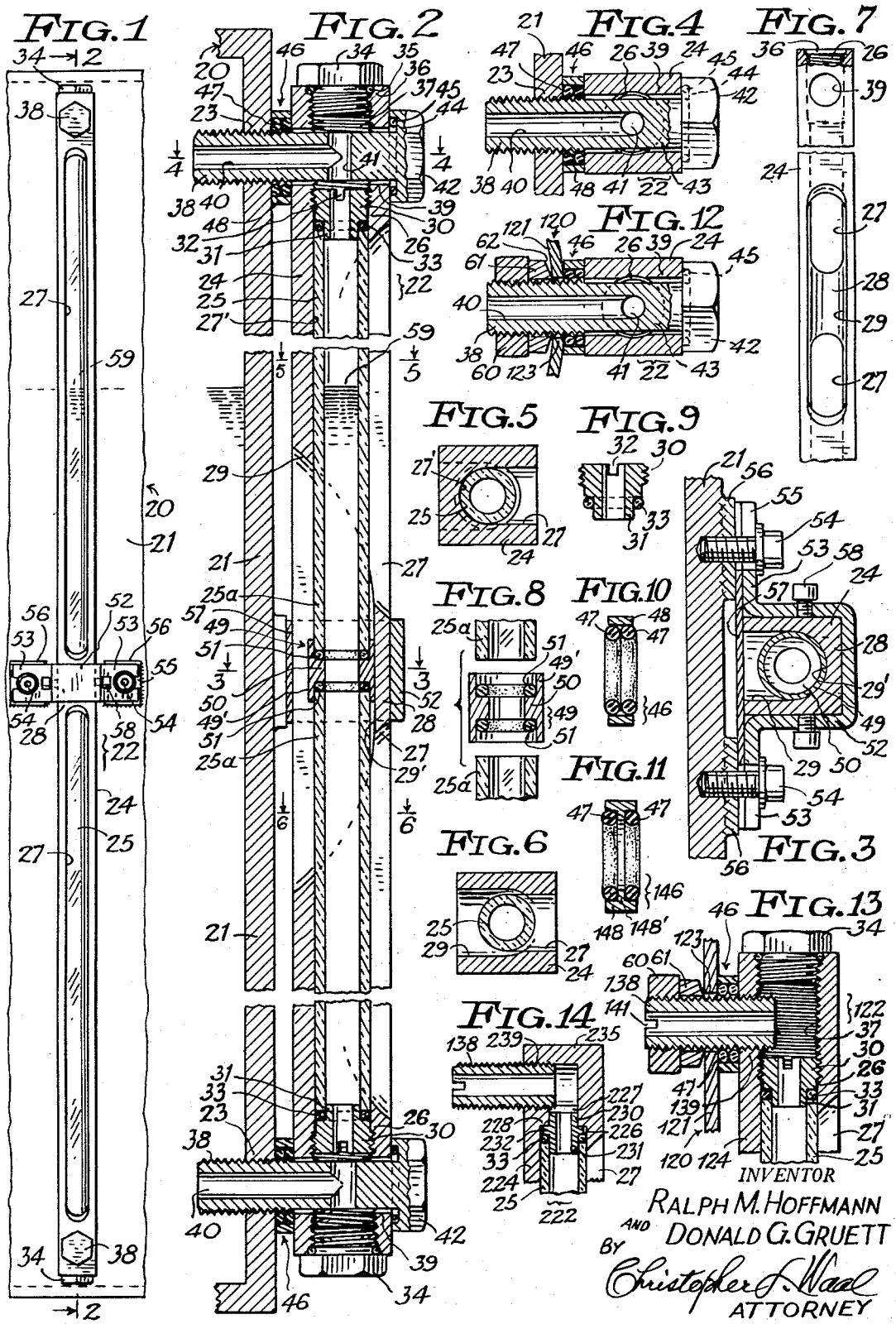
INVENTOR
RALPH M. HOFFMANN
AND DONALD G. GRUETT
BY Christopher␣␣Wad
ATTORNEY

United States Patent Office

3,358,510
Patented Dec. 19, 1967

---

3,358,510
LIQUID LEVEL GAUGE AND METHOD OF MAKING A GAUGE ENCLOSURE
Ralph M. Hoffmann, Manitowoc, and Donald G. Gruett, Green Bay, Wis., assignors to Oil-Rite Corporation, Manitowoc, Wis., a corporation of Wisconsin
Filed Nov. 18, 1964, Ser. No. 412,201
10 Claims. (Cl. 73—329)

This invention relates to liquid level gauges or gauge assemblies of the tubular sight glass type, and to a method of fabricating glass-shielding gauge bodies or enclosures.

An object of the invention is to provide a liquid level gauge or gauge assembly having an improved sight glass enclosure and improved means for readily mounting the same on the wall of a liquid tank or vessel in close relation thereto and for effecting pressure-resistant seals with the tank wall and sight glass.

Another object is to provide an improved liquid level gauge of simple and reliable construction which will accommodate wide ranges of liquid level and minimize danger of glass breakage.

Still another object is to provide a liquid level gauge having improved means for compensating for variations in the distance between gauge mounting openings in the tank and also for compensating for differential thermal expansion of the tank and gauge elements.

A further object is to perfect details of construction generally.

A further object is to proved an improved method for fabricating the sight glass enclosure.

The invention further consists in the several features hereinafter described and claimed.

In the accompanying drawing, illustrating certain embodiments of the invention,

FIG. 1 is a front elevational view of a tank-mounted liquid level gauge constructed in accordance with the invention;

FIG. 2 is a longitudinal sectional elevational view taken generally on the line 2—2 of FIG. 1, parts being broken away;

FIG. 3 is a transverse sectional view taken generally on the line 3—3 of FIG. 2;

FIG. 4 is a transverse sectional view taken generally on the line 4—4 of FIG. 2;

FIG. 5 is a transverse sectional view of the gauge taken generally on the line 5—5 of FIG. 2;

FIG. 6 is a transversed sectional view of the gauge taken generally on the line 6—6 of FIG. 2;

FIG. 7 is a fragmentary rear view of the gauge body or shield, parts being broken away and parts being shown in section;

FIG. 8 is a fragmentary longitudinal exploded sectional view of coupling means for sight glass sections;

FIG. 9 is a detail longitudinal sectional view of a screw bushing assembly forming a gauge glass seat;

FIG. 10 is a sectional view of a sealing ring assembly;

FIG. 11 is a sectional view of a modified sealing ring assembly;

FIG. 12 is a sectional view similar to FIG. 4, showing the gauge applied to a curved thin-walled tank;

FIG. 13 is a sectional view similar to the upper portion of FIG. 2, showing a modified form of gauge mounting; and FIG. 14 is a sectional view similar to FIG. 13, showing a further modified form of gauge mounting.

Referring to FIGS. 1 to 10 of the drawing, 20 designates a liquid holding tank or container, such as a water tank or oil tank, having a vertical wall 21 on which is mounted a liquid level gauge assembly 22 of the invention. The tank wall 21, which is here shown to be flat, but in some instances may be curved, as hereinafter described, is provided with a pair of parallel vertically spaced upper and lower screw-threaded bores 23, FIG. 2, for receiving gauge mounting parts hereinafter described.

The liquid level gauge assembly 22 may be of considerable height, for example about six feet, and is usually mounted in a vertical position as shown. The gauge assembly comprises an elongated one-piece metal gauge body 24 of bar-like shape forming a guard or enclosure housing and shielding therein a tubular sight glass 25 of circular cross-section, such as of Pyrex glass. The gauge body is fabricated from a straight metal bar, such as of aluminum alloy or brass, which is desirably of square cross-section and presents opposite parallel faces. By way of example, in the case of a sight glass having nominal external diameter of one-half inch, a gauge body seven-eighths inch square in cross-section has been found suitable. The metal bar stock used in forming the gauge body or enclosure is preferably solid, because of the desirable physical characteristics obtainable with such stock, although in some instances extruded tubular bar stock may be used. In fabricating the gauge body 24 from a length of solid bar stock, relatively short axially aligned bores 26 are drilled centrally into the opposite ends of the bar. A pair of spaced and longitudinally aligned channels or slots 27 of generally U-shaped cross-section are milled by a rotary form cutter, not shown, into the front face of the bar to provide apertures for exposing the sight glass 25 to view. The aligned channels 27 are disposed in fore-and-aft alignment with the end bores 26 and are cut to a width corresponding generally to the diameter of the end bores. The adjacent ends of the aligned channels 27 are spaced apart generally midway of the length of the gauge body 24 to provide for a bridge 28 therebetween while the opposite ends of the respective channels intersect with the corresponding end bore 26. Each channel 27 has a semi-cylindrical bottom wall 27' as best shown in FIG. 5 produced by the correspondingly rounded peripheral surface of the milling cutter. The semi-cylindrical bottom walls 27' of channels 27 are cut to a depth corresponding to the farmost or rearmost wall portion of the respective bores such that walls 27' of the respective channels 27 form a continuation of the corresponding rearmost bore wall portion. A channel 29 of generally U-shaped cross-section is milled into the rear face of the bar in fore-and-aft alignment with the end bores 26 and intersects with the respective chanels 27. The side walls of channel 29 are spaced apart somewhat wider than the side walls of channels 27 as generally shown in FIG. 6, and the semi-cylindrical bottom wall 29' of channel 29 forms the inner surface of the bridge 28. The respective channels 27 and 29 along with end bores 26 form a generally straight continuous passage coaxially with the end bores and extending the length of the gauge body 24 adapted to receive the tubular sight glass 25.

The aligned bores 26 in the gauge body 24 are screw-threaded at their outer portions to receive respective tubular screw plugs or bushings 30 having reduced inner end nipples 31 entering the ends of the gauge glass, the outer end of each screw plug having a screw-driver slot 32, FIG. 9. Resilient sealing rings 33, such as Buna rubber O-rings, encircle the respective nipples 31 and bear on the accurately ground flat end faces of the tubular gauge glass, the O-rings and gauge glass being placed under axial compression by the screw plugs 30. The outer end of each screw-threaded end bore 26 is closed by a headed screw-threaded closure cap 34 sealed by an encircling resilient O-ring 35 seated in a shallow counterbore 36 formed in the end face of the bar. The respective threaded bushings 30 and the corresponding threaded closure caps 34 and spaced apart to form the chambers 37 therebetween in the respective end bores 26.

The respective end portions of the gauge body 24 are rigidly secured to the tank wall 21 in closely spaced or approximately flush relation thereto by horizontally extending hollow attaching members in the form of headed bolts 38 adapted to engage within the threaded bores 23 in the tank wall 21. The bolts 38 pass through the horizontally extending cross bores 39 which open into the chambers 37 in the respective end bores 26 and are disposed in alignment with the corresponding tank bores 23. Each bolt 38 has an axial conduit-forming bore 40 intersected at its inner end by a communicating cross bore 41 which opens into the corresponding chamber 37, thus affording communication between the interior of tank 20 and the gauge glass 25. The communicating bores in the lower bolt provide a liquid duct into the sight glass 25 while the communicating bores in the upper bolt provide a venting duct.

In the case of a thick tank wall, either flat or curved, or in the case of a tank wall with sufficiently thick boss portions, the hollow bolts 38 are screwed into the threaded openings 23 formed in the wall as shown in FIGS. 2 and 4. The head 42 of each bolt 38 is undercut adjacent to shank 43 to provide a flat-bottomed concentric annular groove 44 for receiving a resilient sealing O-ring 45 which bears on the flat front face of the gauge body 24, the diameter of the O-ring being considerably larger than the diameter of the bore 39. Between the flat rear face of the gauge body 24 and outer face of the tank wall each bolt 38 is encircled by a sealing ring assembly 46, shown separately in FIG. 10, comprising a pair of tandem resilient O-rings 47 radially confined by a narrow metal spacing ring 48. The width of the spacing ring is less than twice the free thickness of each O-ring 47, as seen in FIG. 10, so that the O-rings project beyond the planes of the end faces of the spacing ring. When the bolts 38 are screwed into the tank openings 23 to mount the gauge assembly 22, the two O-rings 47 in the spacing ring 48 and the O-ring 45 in the bolt head groove 44 are axially compressed to provide a sealed connection between the tank and the gauge body 24, the rigid spacing ring being then clamped between the body and the tank. The sealing ring assembly 46 will also provide a seal in the case of a curved tank wall, since the biasing pressure of O-rings 47 in the axial direction will accommodate the tank curvature. The gauge assembly mounting above described wherein the tank wall 21 is provided with bores 23 threadedly receiving bolts 38 does not require access to the interior of the tank.

In accordance with another feature of the invention, provision is made for accommodating variations in the center-line distances between the upper and lower screw-threaded tank bores 23 and also for compensating for differential thermal expansion between the gauge assembly 22 and the tank 20. For this purpose the shank portion 43 of mounting bolts 38 is taken undersize relative to the corresponding cross bore 39 of the gauge body 24 and is loosely disposed therein. By way of example, in a typical gauge assembly 22 in which the diameter of the bolt thread is one-half inch, the diameter of cross bore 39 is slightly more than one-half inch, and the diameter of the unthreaded bolt shank portion may be only seven-sixteenths inch. With this arrangement the distance between the centers of the vertically spaced threaded tank bores 23 may vary as much as one-quarter inch while still maintaining proper sealed connections with the gauge assembly 22. This mounting will also compensate for any differential thermal expansion between the tank and the gauge body. Any differential thermal expansion between the gauge body and the tubular gauge glass is taken up by the associated sealing O-rings 33 engaging the ends of the glass.

When the gauge body is fabricated from a length of tubular bar stock, such as an extruded bar having a longitudinally extending through bore centrally thereof slightly larger than the diameter of the gauge glass, the front and rear slots 27 and 29 are milled into the bar to expose the existing central bore of the bar, and the ends of the bore are screw-threaded to receive the associated parts.

In the case of a relatively long gauge assembly 22, a one-piece tubular sight glass housed in the longitudinal passage of the gauge body 24 may be subjected to abnormal stresses tending to break the glass. Such abnormal stresses may result if the tubular sight glass 25 is not substantially straight or the channels 27 and 29 of the gauge body 24 are misaligned or the gauge body is accidentally bent in shipment, during installation or thereafter. To minimize the danger of glass breakage, the tubular sight glass may be assembled within the gauge body 24 in two aligned sections 25a, the adjacent ends of which are disposed behind the bridge 28. The adjacent aligned ends of the sight glass sections are resiliently and sealingly connected by a coupling assembly 49 including a thin-walled metal coupling sleeve 49' having a medial inwardly projecting annular flange 50 presenting opposed seats for respective upper and lower sealing rings 51, such as Buna rubber O-rings. The adjacent ends of the gauge glass sections fit snugly within the corresponding of sleeve 49' and have ground flat end faces bearing against the sealing rings. The coupling sleeve 49' fits snugly in the rear channel 29 of the gauge body behind the bridge 28.

When the gauge is installed on the tank, it is desirable in the case of a long gauge assembly to anchor the central portion of the gauge body 24 to the tank so as to better protect the assembly against accident. For this purpose, a metal yoke 52 is saddled over the gauge body at the bridge 28 and has opposite bifurcated end portions 53 secured to the tank by screws 54 which pass through horizontal open-ended slots 55 in the yoke end portions. Apertured metal pads 56 are welded to the tank to receive the screws 54 and a horizontally slotted shim plate 57 is interposed between the yoke end portions 53 and the tank pads. If desired, the yoke may additionally be fastened to the gauge body 24, as by screws 58.

In the use of the liquid level gauge assembly 22, the liquid in the tubular sight glass rises and falls freely with the level of the liquid in the tank, and the liquid level 59 is visible through the open front channels 27 of the gauge body. At the front stiffening bridge 28 of the gauge body the liquid level is hidden, but this is found to be unobjectionable in view of the relatively short span between the adjacent ends of the spaced channels 27. The liquid in the tank may be at atmospheric pressure or at a higher or lower pressure. The bottom closure cap 34 of the gauge may be used as a drain plug.

A modified form of sealing ring assembly 146 for disposal around mounting bolts 38 between the tank wall 21 and the gauge body 24 is shown in FIG. 11 and comprises a metal spacing ring 148 having a central inner annular flange 148'. The annular flange 148' providing oppositely facing seats for the two O-rings 47 which in their unstressed condition project axially beyond the plane of the corresponding end face of the spacing ring. This sealing ring assembly is used in the same manner as the sealing ring assembly of FIG. 10.

In the modified form of gauge assembly mounting shown in FIG. 12, the tank 120 has a thin curved wall 121 which is provided with unthreaded openings 123 for receiving the mounting bolts 38. Interiorly of the tank each bolt is fastened by a nut 60 and a washer 61 is interposed between the nut and the inner face of the tank wall, the washer having a bevel face 62 confronting the tank wall to accommodate the curvature thereof. A sealing ring assembly 46 encircles the bolt and is interposed between the gauge body and the tank wall, as in FIG. 4. The gauge mounting of FIG. 12 requires access to the interior of the tank to apply the gauge assembly. In the case of the flat tank wall, not shown, the bevel-faced washer 61 can be omitted or replaced by a plain washer.

In the modified form of liquid level gauge assembly 122 shown in FIG. 13, each end portion of the gauge body 124 has a horizontal screw-threaded opening 139 at its rear face communicating with the chamber 37 in the vertical bore 26 between the closure screw cap 34 and the glass-engaging bushing 30, and the front face of the gauge bar at this region is left closed. A tubular screw stud 138 has its front end screwed into the opening 139 and has its rear end provided with a screw-driver slot 141. The projecting rear portion of the hollow screw stud passes through an opening 123 in the tank wall 121 and is secured by a nut 60 and a bevel-faced washer 61, as in FIG. 12, the tank wall being either flat or curved. A sealing O-ring assembly 46 is interposed between the flat rear face of the bar and the outer face of the tank wall, as in the mounting of FIG. 12.

The modified liquid level gauge assembly 222 shown in FIG. 14 includes a bar-like gauge body 224 similar to the gauge body of FIG. 13 except that this body has one integrally closed end wall 235, preferably at the upper end of the body. The adjacent central longitudinal bore is drilled from the open opposite end of the body and communicates with the adjacent end of the upper window-forming channel 27. The bore 226 includes a reduced upper extension 227 to form an annular shoulder 228. A tubular seat-forming bushing 230 with an intermediate peripheral flange 232 is pressed into the bore 226 against the shoulder 228 as a substitute for the screw-type bushing 30 of FIG. 9. The reduced nipple-forming free end 231 of the bushing 230 projects into the adjacent end of the tubular sight glass 25 and is surrounded by a resilient sealing ring 33, such as an O-ring, against which bears the flat end face of the sight glass. The subsequently closed lower end, not shown, of the gauge body 224 has a glass-confining screw bushing, 30 shown used in FIG. 2, and the glass is held under axial compression, as in the gauge of FIG. 2. The gauge body 224 of FIG. 14 is provided with a fore-and-aft extending screw-threaded bore 239 which intersects with the bore 227 and is adapted to receive the hollow attaching screw stud 138 to form an upper vent connection for the gauge assembly. The stepped bore 226, 227 at the closed end of the gauge body can be formed by a suitably guided drilling device introduced from the open end of the channeled gauge body.

The liquid level gauge of the present invention has numerous applications, such as for use with tanks, reservoirs, packaged hydraulic equipment, large steel mill pumps, and hydraulic presses. A wide-range gauge constructed in accordance with the invention can replace several tandem-connected gauges of conventional construction.

We claim:

1. A liquid level gauge comprising a gauge body having a passage extending longitudinally therein, said passage communicating with longitudinally spaced and aligned window-forming front slots and an intermediate longitudinal rear slot, said gauge body having a bridge connection between the adjacent ends of said front slots, and said rear slot being disposed behind said bridge connection and being wider than said front slots, a tubular sight glass extending longitudinally in said passage and formed of a plurality of axially aligned communicating sections, a coupling sleeve surrounding the adjacent ends of said sight glass sections and having a medial inwardly projecting annular flange, compressible sealing rings interposed between said flange and the adjacent ends of said sight glass sections, and means for holding said sight glass sections under axial compression, said coupling sleeve being disposed behind said bridge connection and confined in said rear slot.

2. A liquid level gauge adapted for mounting on the wall of a liquid container, comprising a gauge body having a passage extending longitudinally therethrough, said passage being formed by opposite end bores and front and rear longitudinal slots, said front slots forming viewing windows and having spaced adjacent ends separated by a bridge connection, said rear slot extending behind said bridge connection and forming a portion of said passage, a tubular sight glass extending longitudinally in said passage and having opposite ends disposed in said end bores, means for placing said sight glass under axial compression including tubular bushings screw-threaded into said respective end bores and sealing means interposed between each bushing and the adjacent end of the sight glass, closure members screw-threaded into said bores and spaced outwardly from the corresponding bushings to form a chamber in each end bore between the closure member and the bushing, and tubular screw-threaded fastening members projecting rearwardly from the opposite end portions of said gauge body and adapted for securement to the container wall said tubular fastening members opening into the corresponding bore chambers to place the sight glass in communication with the container.

3. A liquid level gauge comprising a gauge body having a passage extending longitudinally therein including aligned end bores, a tubular sight glass extending longitudinally in said passage and into said end bores and having a sealed connection in said end bores, said passage including an intermediate longitudinal slot at one side of said gauge body and longitudinally spaced and aligned window-forming slots at the opposite side of the gauge body, said spaced slots terminating at their adjacent ends at an intervening bridge connection opposite said intermediate slot, the bottoms of said intermediate slot and said aligned slots being cylindrically concave to extend about said sight glass.

4. A liquid level gauge adapted for mounting on a wall of a liquid container, comprising a gauge body having axially aligned bores in opposite ends thereof and a passage connecting said bores and including a slot-like viewing window, a tubular sight glass extending longitudinally in said passage and being open at opposite ends, sealing means in said end bores engaging the opposite ends of said sight glass, closure means closing the outer ends of said end bores, the opposite end portions of said gauge body having parallel bores therethrough extending between front and rear faces of the gauge body, attaching conduit-forming bolts extending through each of said parallel through bores and adapted for securing said gauge body to the container wall, each bolt having a tubular shank portion of smaller diameter than the associated through bore in said gauge body and having a head adapted to bear on the front face of the gauge body about said through bore, the inner face of each bolt head having an annular recess surrounding said shank, an axially compressible sealing ring seated in said recess and engageable with the front face of the gauge body, said bolt shank having a screw-threaded inner end adapted to be screwed into an aperture in said container wall for clamping said gauge body to the container wall, and a sealing assembly encircling said shank and including axially compressible sealing rings for effecting a liquid-tight joint between said gauge body and said container wall, said tubular bolt shank being apertured to provide communication between the liquid container and the adjacent open end of the sight glass, and each bolt being shiftable in the associated through bore of the gauge body to compensate for inaccuracies in the center line distance between the container wall openings.

5. In a liquid level gauge adapted for mounting on the wall of a container for liquids, a tubular sight glass viewable in the front face and adapted for communication with the liquid in the container, and a gauge body for supporting the sight glass and being formed from a bar-like member of substantial length, the opposite ends of said member being provided with a drilled end bore having a diameter exceeding that of the sight glass, said end bores being axially aligned and disposed generally centrally of said member, said member being further provided with longitudinally extending channel means milled in fore-and-aft alignment with the end bores, said milled channel means intersecting with said end bores and having a width generally corresponding to the diameter of said bores and a depth extending at least to the farmost wall portion of said bores, said channel means together with said end bores providing a continuous passage in said member coaxially with the end bores for receiving and supporting the sight glass.

6. The invention as set forth in claim 5 wherein at least a portion of said channel means are milled in the front face of the bar-like member for exposing the sight glass to view.

7. The invention as set forth in claim 5 wherein the channel means in said bar-like member comprise a pair of longitudinally spaced and aligned first channels milled in the front face of said member to serve as extensions of the corresponding end bores and as apertures for exposing the sight glass to view, and an intermediate channel milled in the rear face of said member to place the bore extensions formed by said first channels in communication to form said continuous passage for receiving and supporting the sight glass.

8. In a liquid level gauge adapted for mounting on the wall of a container for liquids, a tubular sight glass adapted for communication with the liquid in the container, and a gauge body for supporting the sight glass and being formed from a bar-like member of substantial length having opposed front and rear faces, the opposite end of said member being provided with an end bore having a diameter exceeding that of the sight glass, said end bores being axially aligned and disposed generally centrally of said member, said member being provided with a pair of longitudinally spaced and aligned first channels in the front face thereof in fore-and-aft alignment with the end bores, said first channels intersecting with said end bores and having a width generally corresponding to the diameter of said bores and a depth extending to the rearmost wall portion of said bores, said first channels serving as extensions of the corresponding end bores and as apertures for exposing the sight glass to view, said member being further provided with an intermediate channel in the rear face thereof in fore-and-aft alignment with the end bores and intersecting with said first channels, said intermediate channel having width at least as wide as the first channels and a depth extending at least to the forwardmost wall portion of said bores and placing the bore extensions formed by said first channels in communication to thereby form a continuous passage in said member coaxially with said end bores for receiving and supporting the sight glass.

9. The invention as set forth in claim 8 wherein the space between the aligned first channels in the front face of said member forms a reinforcing bridge generally midway of the length of the gauge body and said intermediate channel defines the inner surface of said bridge.

10. The invention as set forth in claim 9 wherein the sight glass is divided into two axially aligned sections which are sealingly joined behind said reinforcing bridge.

References Cited
UNITED STATES PATENTS

| | | | |
|---|---|---|---|
| 442,010 | 12/1890 | Brooks | 73—329 |
| 1,702,447 | 2/1929 | McBrayer | 73—352 |
| 1,743,230 | 1/1930 | Osborn | 73—328 |
| 1,832,106 | 11/1931 | Ernst | 73—328 |

FOREIGN PATENTS

| | | |
|---|---|---|
| 809,828 | 4/1959 | Great Britain. |

LOUIS R. PRINCE, *Primary Examiner.*

D. YASICH, *Assistant Examiner.*

UNITED STATES PATENT OFFICE
CERTIFICATE OF CORRECTION

Patent No. 3,358,510                          December 19, 1967

Ralph M. Hoffmann et al.

It is hereby certified that error appears in the above numbered patent requiring correction and that the said Letters Patent should read as corrected below.

Column 1, line 30, for "proved" read -- provide --; column 2, line 71, for "and" read -- are --; column 4, line 22, after "corresponding" insert -- ends --; line 54, for "providing" read -- provides --; column 5, line 19, after "bore" insert -- 226 --; column 6, line 14, after "wall" insert a comma.

Signed and sealed this 18th day of March 1969.

(SEAL)
Attest:

Edward M. Fletcher, Jr.                          EDWARD J. BRENNER
Attesting Officer                              Commissioner of Patents